United States Patent
Kano et al.

(10) Patent No.: US 10,460,891 B2
(45) Date of Patent: Oct. 29, 2019

(54) KEYBOARD DEVICE AND ELECTRONIC APPARATUS

(71) Applicant: NEC PERSONAL COMPUTERS, LTD., Tokyo (JP)

(72) Inventors: Toshiaki Kano, Tokyo (JP); Takahiro Funayama, Tokyo (JP)

(73) Assignee: NEC PERSONAL COMPUTERS, LTD., Tokyo (JP)

( * ) Notice: Subject to any disclaimer, the term of this patent is extended or adjusted under 35 U.S.C. 154(b) by 0 days.

(21) Appl. No.: 16/120,274

(22) Filed: Sep. 2, 2018

(65) Prior Publication Data

US 2019/0115169 A1   Apr. 18, 2019

(30) Foreign Application Priority Data

Oct. 18, 2017 (JP) ................. 2017-201602

(51) Int. Cl.
*H01H 13/83* (2006.01)
*H01H 13/7065* (2006.01)
*G06F 1/16* (2006.01)

(52) U.S. Cl.
CPC ....... *H01H 13/7065* (2013.01); *G06F 1/1616* (2013.01); *G06F 1/1637* (2013.01); *G06F 1/1662* (2013.01); *G06F 1/1681* (2013.01)

(58) Field of Classification Search
CPC .... H01H 3/125; H01H 13/83; H01H 13/7065; H01H 13/88; H01H 13/86; H01H 13/704; H01H 2233/002; H01H 2221/04; H01H 13/70; H01H 13/85; H01H 2215/006; H01H 2217/012; H01H 2239/074; H01H 2229/028; H01H 2229/024; H01H 2223/034; H01H 2213/01; G06F 3/0202
See application file for complete search history.

(56) References Cited

U.S. PATENT DOCUMENTS

| | | | | |
|---|---|---|---|---|
| 2011/0297523 A1* | 12/2011 | Tsai | ....................... | H01H 3/125 200/5 A |
| 2016/0049266 A1* | 2/2016 | Stringer | ............... | H01H 13/704 200/5 A |

FOREIGN PATENT DOCUMENTS

JP   2016-143176 A   8/2016

* cited by examiner

*Primary Examiner* — Ahmed M Saeed
(74) *Attorney, Agent, or Firm* — Shimokaji IP

(57) ABSTRACT

A keyboard device has a base sheet, a membrane sheet disposed on the upper surface of the base sheet, a cover sheet disposed on the upper surface of the membrane sheet and supporting the membrane sheet between the cover sheet and the base sheet in a state of being movable in the in-plane direction, connection members connecting the base sheet and the cover sheet, a plurality of key tops vertically movably supported by a guide mechanism provided on the upper surface side of the cover sheet and bringing a movable contact and a fixed contact which are contacts of the membrane sheet into contact with each other or separating the contacts from each other by being depressed, and a frame member partitioning the key tops adjacent to each other by being depressed and having a lower surface to which the upper surface of the cover sheet is bonded and fixed.

6 Claims, 7 Drawing Sheets

KEYBOARD DEVICE AND ELECTRONIC APPARATUS

FIELD OF THE INVENTION

The present invention relates to a keyboard device and an electronic apparatus having the keyboard device.

BACKGROUND OF THE INVENTION

Keyboard devices for use in electronic apparatuses, such as a personal computer (PC), include an isolation type structure in which key tops are partitioned with a frame member. The isolation type keyboard device can be configured so that the operation surface is flat, and therefore the appearance quality is high. Moreover, the keyboard device can be configured so that a gap between the key tops, i.e., a gap between the key top and the frame member, is made smaller than a gap in a common keyboard device which is not the isolation type, and therefore a fall of wastes and the like can be suppressed.

Such a keyboard device is generally configured so that a keyboard assembly in which a membrane sheet is laminated on an aluminum base plate and the key tops are vertically movably supported thereon is connected and fixed to the lower surface of the frame member in a suspended state using a plurality of screws (for example, see Japanese Patent Application Laid-Open No. 2016-143176).

SUMMARY OF THE INVENTION

According to the configuration of the above-described conventional technique, the keyboard device is soft due to rigidity shortage, and, in order to prevent a reduction in an operation feeling of the key tops, the keyboard assembly is fixed to the frame member using a large number of screws equal to several tens of screws. Therefore, according to this configuration, the use of the large number of screws increases the number of components to thereby increase the cost and the weight and an assembling operation also takes time and effort. Furthermore, this configuration requires the formation of screw holes into which the large number of screws are screwed in the frame member and also requires the time and effort and the cost for the operation.

The present invention has been made in consideration of the problems of the conventional technique described above. It is an object of the present invention to provide a keyboard device capable of reducing the cost, the weight, and an operation process and an electronic apparatus having the keyboard device.

A keyboard device according to a first aspect of the present invention has a first sheet-like member, a membrane sheet disposed on the upper surface of the first sheet-like member, a second sheet-like member disposed on the upper surface of the membrane sheet and supports the membrane sheet between the first sheet-like member and the second sheet-like member in a state of being movable in the in-plane direction, a connection member connecting the first sheet-like member and the second sheet-like member, a plurality of key tops vertically movably supported by a guide mechanism provided on the upper surface side of the second sheet-like member and bringing contacts of the membrane sheet into contact with each other or separating the contacts from each other by being depressed, and a frame member partitioning the key tops adjacent to each other and having a lower surface to which the upper surface of the second sheet-like member is bonded and fixed.

According to such a configuration, the second sheet-like member supporting the membrane sheet between the first sheet-like member and the second sheet-like member and the frame member are bonded and fixed to each other. More specifically, a keyboard assembly provided with the membrane sheet and the key tops is bonded and fixed to the frame member, and therefore the keyboard device does not require the use of a large number of screws for the fixation thereof and can also be configured so as to use no screws. Therefore, the keyboard device can prevent an increase in the cost and the weight due to an increase in the number of components while securing the rigidity and securing a high operation feeling of the key tops and further can also reduce an assembling operation process and a screw hole processing operation to the frame member. Moreover, in the keyboard device, the membrane sheet is supported between the first sheet-like member and the second sheet-like member connected to each other by the connection member in the state of being movable in the in-plane direction. Therefore, even in a case where the membrane sheet thermally expands or the like under influence of environmental temperatures and the like, the membrane sheet expandably moves between the first sheet-like member and the second sheet-like member, whereby the occurrence of malfunctions that the contacts of the membrane sheet are always closed, for example, can be prevented.

The first sheet-like member and the second sheet-like member may be configured so as to be formed of resin materials. Thus, a considerable weight reduction is enabled as compared with a case where the first sheet-like member and the second sheet-like member are formed of metal materials, such as aluminum. In this case, the keyboard assembly provided with the membrane sheet and the key tops is directly bonded and fixed to the frame member, and therefore the keyboard device can secure high rigidity while forming the first sheet-like member and the second sheet-like member by resin materials.

A configuration may be acceptable in which the frame member has an outer frame portion provided so as to surround the entire outer periphery of the plurality of key tops and an inner frame portion provided in a mesh shape to partition the key tops inside the outer frame portion and the second sheet-like member is bonded and fixed to the outer frame portion and the inner frame portion. Thus, in the keyboard device, an outer peripheral edge portion of the keyboard assembly provided with the membrane sheet and the key tops and the circumference of each key top are bonded and fixed to the frame member. Therefore, the keyboard device can obtain higher rigidity, and thus the quality of the operation feeling of each key top becomes higher.

A configuration may be acceptable in which a support placed between the first sheet-like member and the second sheet-like member and regulating the interval between the first sheet-like member and the second sheet-like member to a dimension larger than the plate thickness of the membrane sheet is provided. Thus, space movably accommodating the membrane sheet can be certainly formed between the first sheet-like member and the second sheet-like member.

A configuration may be acceptable in which the connection member is a pin-shaped member suspended from a support member supporting the guide mechanism on the upper surface of the second sheet-like member and the pin-shaped member is connected to the first sheet-like member passing through a hole portion provided in the second sheet-like member and a hole portion provided in the membrane sheet, and a gap is provided between the inner surface of the hole portion of the membrane sheet and the outer surface of the pin-shaped member. Thus, although the connection member is simply configured, the membrane sheet can be movably supported between the first sheet-like member and the second sheet-like member while certainly connecting the first sheet-like member and the second sheet-like member.

A configuration may be acceptable in which the connection member is a pin-shaped member projecting from the first sheet-like member and the pin-shaped member projects from the upper surface of the second sheet-like member passing through a hole portion provided in the membrane sheet and a hole portion provided in the second sheet-like member, the tip of the pin-shaped member has a connection portion connected to the guide mechanism or is connected to a support member supporting the guide mechanism on the upper surface of the second sheet-like member, and a gap is provided between the inner surface of the hole portion of the membrane sheet and the outer surface of the pin-shaped member. Thus, although the connection member is simply configured, the membrane sheet can be movably supported between the first sheet-like member and the second sheet-like member while certainly connecting the first sheet-like member and the second sheet-like member.

The keyboard device may be configured so as to be provided with a sensor capable of detecting a touch operation to the key top on the lower surface side of the first sheet-like member. More specifically, by configuring the key board device so that no metal materials are present from the key tops to the first sheet-like member and providing the sensor on the lower surface side of the first sheet-like member, a touch operation of tracing the upper surface of each key top with a fingertip or the like can be detected.

An electronic apparatus according to a second aspect of the present invention has a body chassis provided with the keyboard devices of the above-described configurations and a display chassis rotatably connected to the body chassis using hinges. According to such a configuration, the cost, the weight, and the operation process of the keyboard device can be reduced, and therefore the cost and the weight can be reduced as the entire electronic apparatus.

The above-described aspects of the present invention can reduce the cost, the weight, and the operation process.

DETAILED DESCRIPTION OF THE INVENTION

Hereinafter, a keyboard device according to the present invention is described in detail based on a preferable embodiment in which an electronic apparatus having the device is exemplified with reference to the attached drawings.

Figure 1:
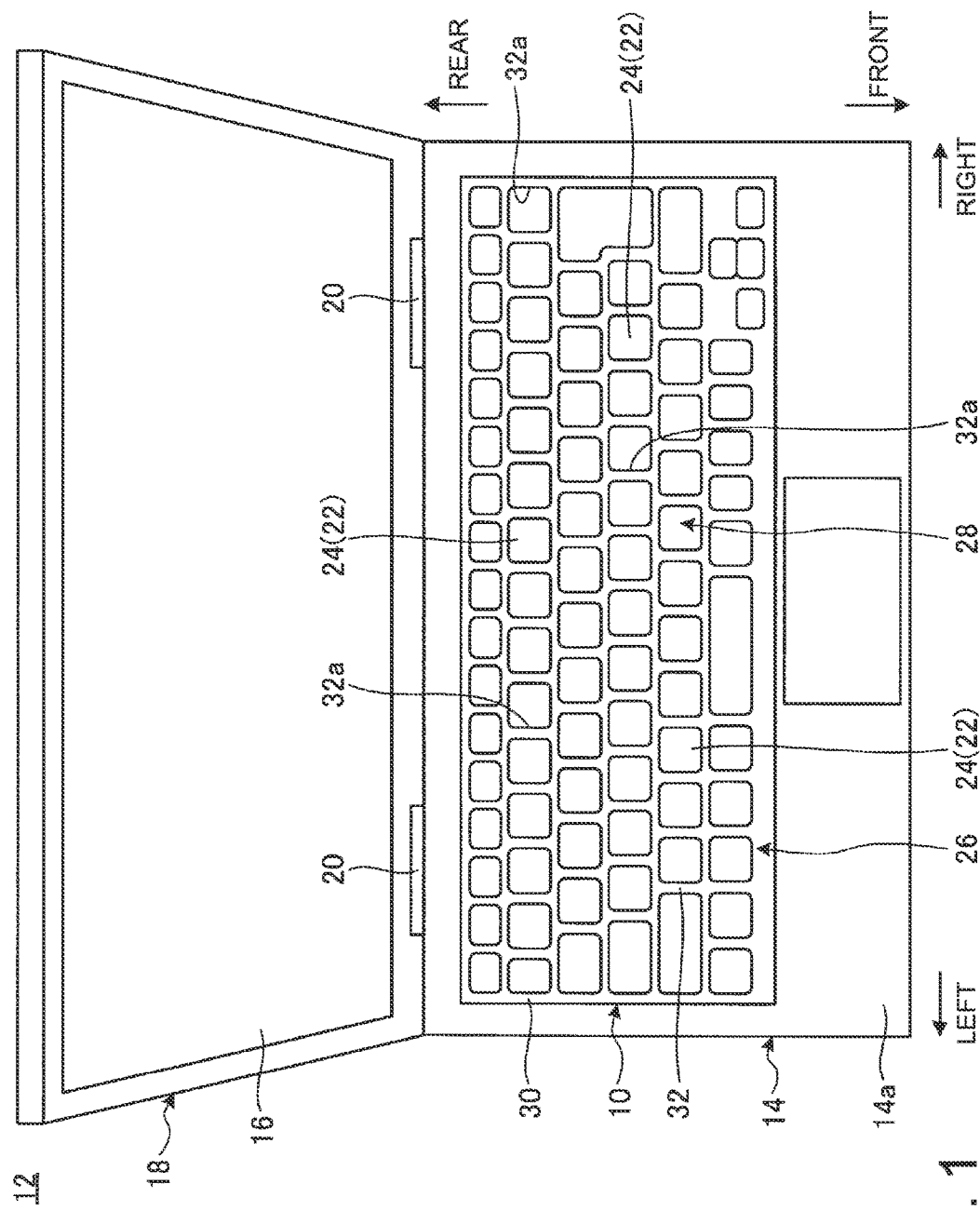
FIG. 1 is a view illustrating an electronic apparatus having a keyboard device according to one embodiment of the present invention looked down from above.

FIG. 1 is a view of an electronic apparatus 12 having a keyboard device 10 according to one embodiment of the present invention looked down from above. The electronic apparatus 12 is a clamshell Laptop PC in which a body chassis 14 provided with the keyboard device 10 and a display chassis 18 provided with a display 16 are openably connected to each other with hinges 20. The present invention may be used for electronic apparatuses other than Laptop PCs. Moreover, the present invention may be used for a keyboard device serving as an extension device from/to which a tablet PC, for example, can be detached and attached, an external keyboard device for use in a desktop PC or the like, for example.

Hereinafter, the keyboard device 10 is described while defining the front side as the front, the deep side as the rear, the thickness direction as the top and the bottom, and the width direction as the right and the left based on a state of being mounted in the electronic apparatus 12 as illustrated in FIG. 1 for use.

The body chassis 14 accommodates various kinds of electronic components, such as a substrate, an arithmetic processing unit, a hard disk device, and a memory, which are not illustrated therein. The keyboard device 10 is provided on the upper surface of the body chassis 14. The display chassis 18 has the display 16 configured by a liquid crystal display or the like on the front surface. The display chassis 18 is rotatably connected to a back end portion of the body chassis 14 through the hinges 20.

The keyboard device 10 has a plurality of key switches 22. The keyboard device 10 is an isolation type keyboard device in which the circumferences of key tops 24 serving as the operation surface of the key switches 22 are partitioned with a frame member 26. The keyboard device 10 has a structure in which a keyboard assembly 28 to which the key switches 22 and the like are assembled is bonded and fixed to the frame member 26.

Figure 2:
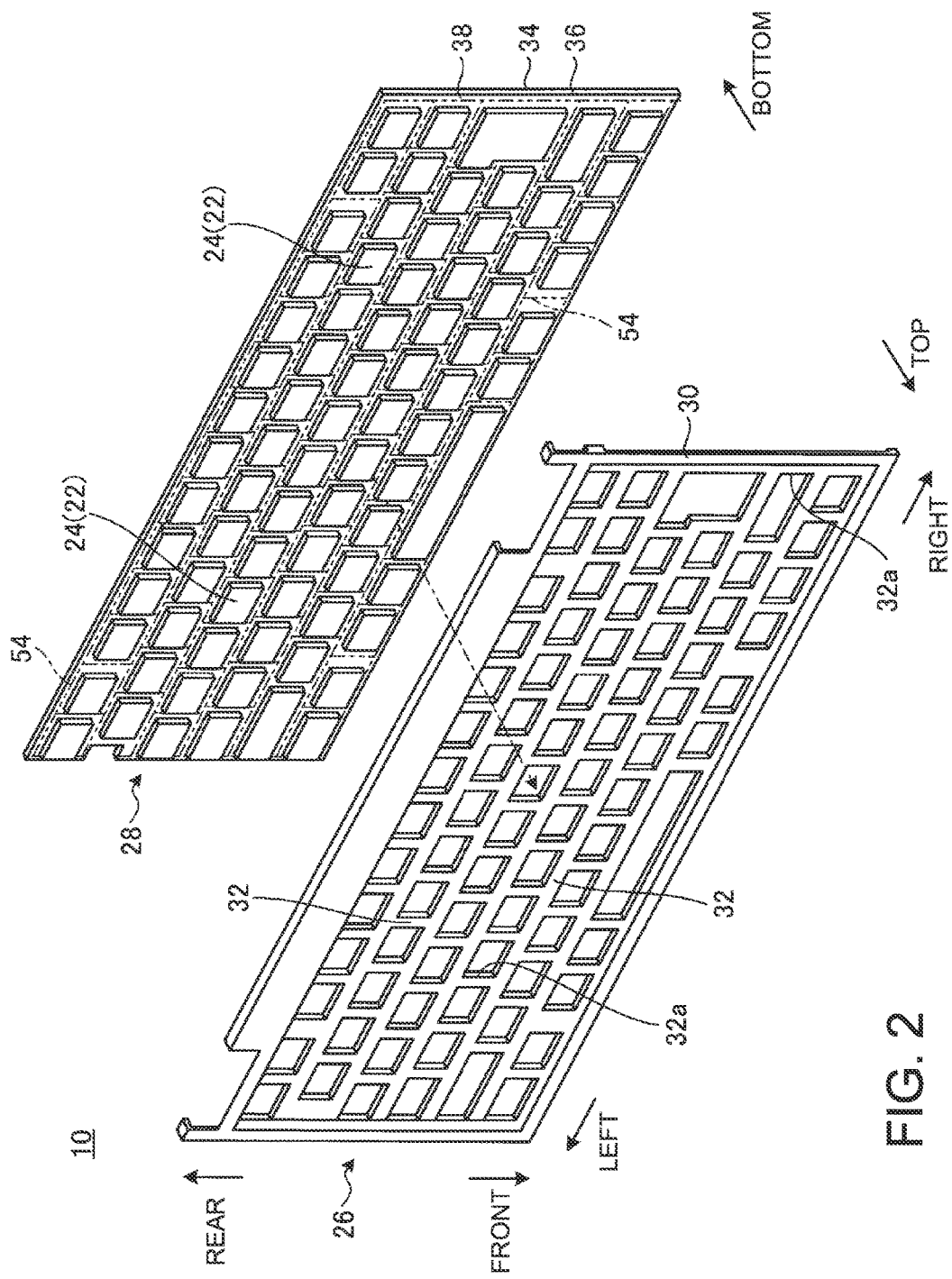
FIG. 2 is an exploded perspective view illustrating a state of attaching a keyboard assembly to a frame member.
Figure 3:
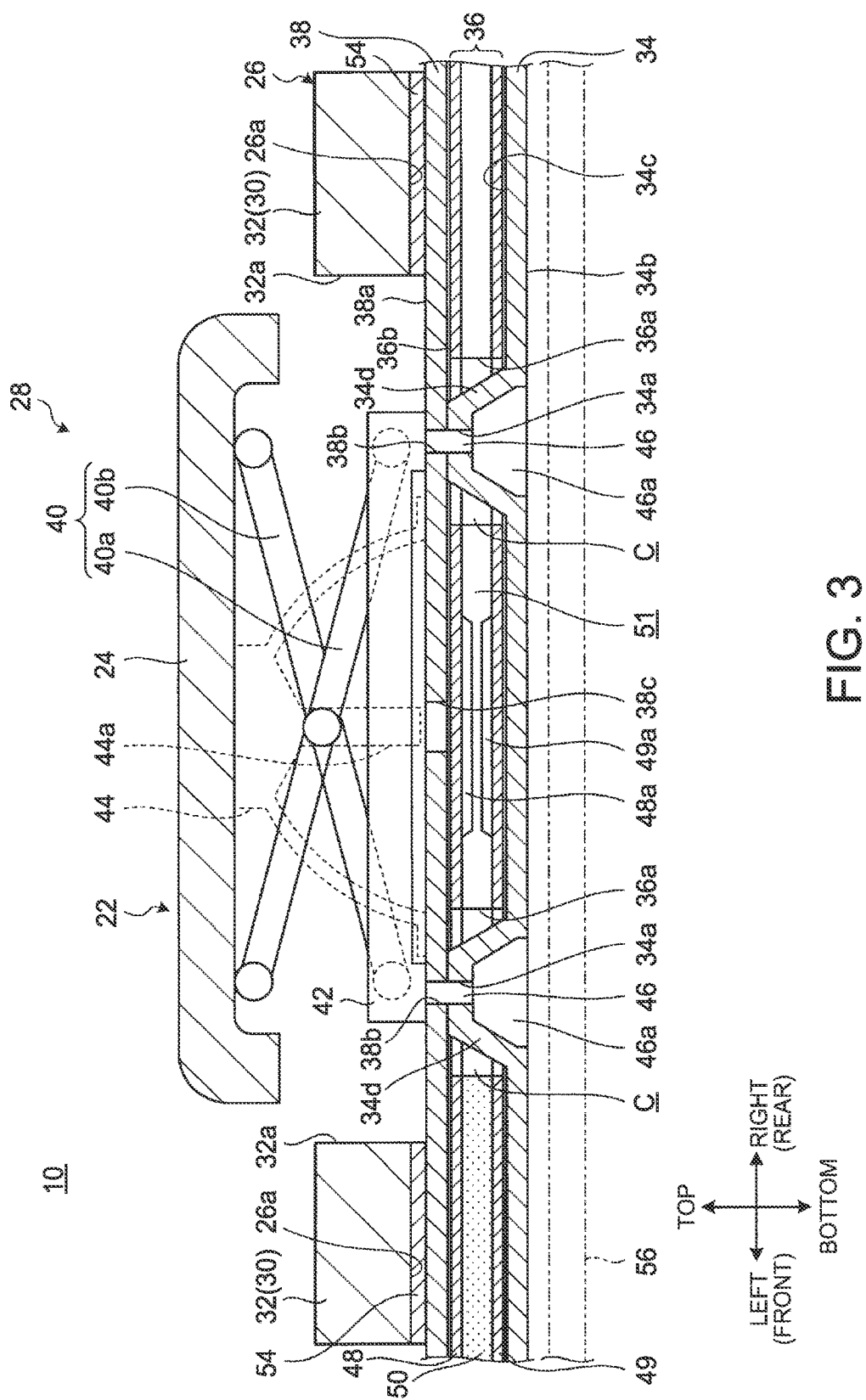
FIG. 3 is a side cross-sectional view schematically illustrating the configuration of the keyboard device.

FIG. 2 is an exploded perspective view illustrating a state where the keyboard assembly 28 is attached to the frame member 26. FIG. 3 is a side cross-sectional view schematically illustrating the configuration of the keyboard device 10.

As illustrated in FIG. 1 to FIG. 3, the frame member 26 has an outer frame portion 30 and an inner frame portion 32 and is formed of resin materials, metal materials, or the like. The outer frame portion 30 is a rectangular frame portion provided so as to surround the entire outer periphery of the key tops 24. The inner frame portion 32 is a frame portion of a mesh shape which is provided inside the outer frame portion 30 and has a plurality of key arrangement holes 32a in which the key tops 24 are inserted and arranged. Thus, in the key tops 24, the key tops 24 adjacent to each other are partitioned with the inner frame portion 32 and the key tops 24 each are independently arranged.

The frame member 26 is provided so as to be substantially flush with or somewhat lower than the upper surface of the body chassis 14 and the operation surface of each key top 24 (see FIG. 3). In the case of this embodiment, the frame member 26 is a separate member from an upper surface cover 14a of the body chassis 14 (see FIG. 1 and FIG. 2) but the frame member 26 may be an integral structure with the upper surface cover 14a.

As illustrated in FIG. 3, the keyboard assembly 28 has a base sheet (first sheet-like member) 34, a membrane sheet 36, a cover sheet (second sheet-like member) 38, and the plurality of key switches 22.

Each key switch 22 has the key top 24, a guide mechanism 40, a holder (support member) 42, and a rubber dome 44.

The guide mechanism 40 vertically movably supports the key top 24 on an upper surface 38a side of the cover sheet 38. The guide mechanism 40 is a pantograph mechanism in which a pair of frame bodies 40a and 40b rotatably crossing each other is disposed between the lower surface of the key top 24 and the upper surface 38a of the cover sheet 38. In the configuration example illustrated in FIG. 3, upper rotation shafts of the frame bodies 40a and 40b are rotatably supported on the lower surface side of the key top 24 and lower rotation shafts of the frame bodies 40a and 40b are rotatably and horizontally movably supported by the holder 42 disposed on the upper surface 38a in the guide mechanism 40.

The holder 42 is a rectangular frame-like support member disposed on the upper surface 38a of the cover sheet 38 and supporting the lower rotation shafts of the guide mechanism 40. In the holder 42, connection members (pin-shaped member) 46 are suspended from the four corners of the lower surface of the holder 42, for example. Each connection member 46 is a pin-shaped member of a cylindrical shape or a prism shape projecting downward from the lower surface of the holder 42. Each connection member 46 penetrates the cover sheet 38 and the membrane sheet 36 and the tip (lower end) thereof is connected to the base sheet 34 using a locking piece 46a. The locking piece 46a is a circular plate provided at the tip of the connection member 46 passing through a hole portion 34a of the base sheet 34, for example, and is locked with a support portion 34d on a lower surface 34b side of the base sheet 34. Thus, the connection members 46 connect the cover sheet 38 and the base sheet 34 in a state where the membrane sheet 36 is sandwiched therebetween. In the connection member 46, the locking piece 46a may be omitted and the tip thereof may be bonded and fixed, for example, to the base sheet 34.

The rubber dome 44 is a dome-shaped member formed of elastic materials having flexibility, such as silicone rubber. The rubber dome 44 is disposed between the cover sheet 38 and the key top 24. In the rubber dome 44, a pressing portion 44a is suspended from the center of the top surface in the dome. The pressing portion 44a is disposed and directed to an opening 38c of the cover sheet 38. The rubber dome 44 is elastically deformed when the key top 24 is depressed to press the membrane sheet 36 by the pressing portion 44a passing through the opening 38c of the cover sheet 38 and, on the other hand, returns the key top 24 to the original position by the elastic force when the depression operation of the key top 24 is canceled.

The base sheet 34 is a sheet-like member formed of resin materials, such as polyethylene terephthalate (PET) and polycarbonate (PC), for example. The plate thickness of the base sheet 34 is about 0.1 mm to 0.3 mm and 0.2 mm in this embodiment, for example. The base sheet 34 may be configured by by molding metal materials, such as aluminum, into a sheet-like member. However, the weight of the metal materials is generally larger than that of the resin materials, and therefore, when the base sheet 34 is formed of metal, the weight of the keyboard device 10 may increase.

The base sheet 34 has support portions 34d at positions overlapping with the connection members 46. The support portion 34d has a structure in which an upper surface 34c side is bulged in a dish shape (drawing structure) by sub-jecting a part of the base sheet 34 to an upward drawing operation, for example. In the support portions 34d, the upper surface 34c located on the top surface abuts on the lower surface of the cover sheet 38 through hole portions 36a of the membrane sheet 36. More specifically, the support portion 34d is a support forming space accommodating the membrane sheet 36 in a state of being movable in the in-plane direction (forward and backward direction or horizontal direction) between the cover sheet 38 and the base sheet 34 and has a height dimension larger than the plate thickness of the membrane sheet 36. The hole portions 34a are formed in the support portions 34d. The locking piece 46a of the connection member 46 is accommodated and disposed on the lower surface 34b side of the support portion 34d. For example, a configuration may be acceptable in which the connection members 46 are individually and firmly stuck to the cover sheet 38 and the base sheet 34 and the support portions 34d are omitted. In this case, the connection members 46 function as supports between the cover sheet 38 and the base sheet 34 and the same applies to a case of a configuration using connection members 60 described below.

Figure 4:
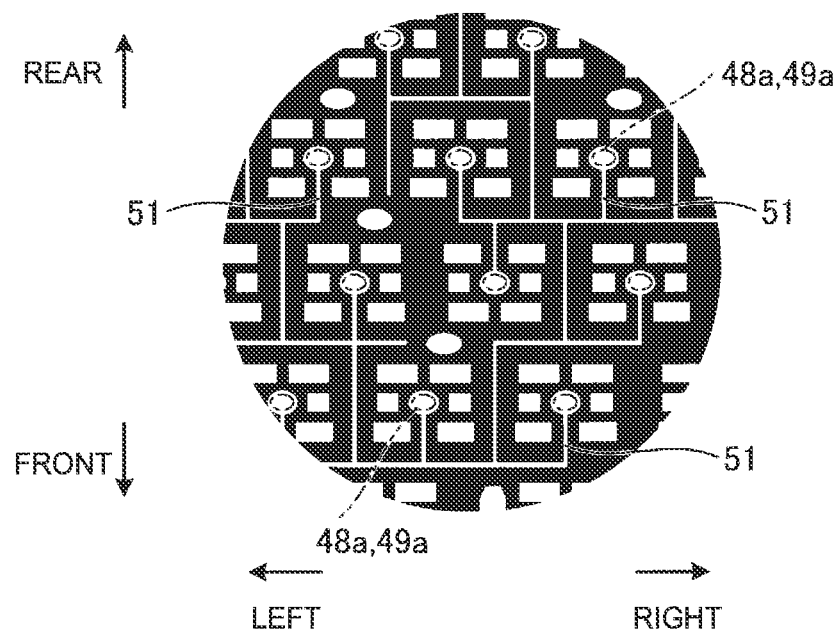
FIG. 4 is an enlarged plan view of a principal portion illustrating the configuration of a ventilation passage provided in a membrane sheet.

The membrane sheet 36 is laminated on the upper surface 34c of the base sheet 34. The membrane sheet 36 has a three-layer structure in which a spacer 50 is sandwiched between an upper contact sheet 48 and a lower contact sheet 49, for example. A movable contact 48a is provided on the inner surface of the upper contact sheet 48 and a fixed contact 49a is provided on the inner surface of the lower contact sheet 49. The movable contact 48a and the fixed contact 49a are disposed facing each other in the internal space (ventilation passage 51) of the membrane sheet 36 formed by the spacer 50. As illustrated in FIG. 4, the ventilation passage 51 is a tunnel-shaped channel which is located under each key switch 22 and extends in communication from contact portions where the movable contact 48a and the fixed contact 49a are disposed facing each other and in which air can circulate. FIG. 3, etc., schematically illustrate that the ventilation passage 51 is formed between the upper contact sheet 48 and the lower contact sheet 49 in order to secure the ease of viewing of the drawings. However, the ventilation passage 51 is actually formed between the upper contact sheet 48 and the spacer 50 and between the lower contact sheet 49 and the spacer 50.

Figure 5:
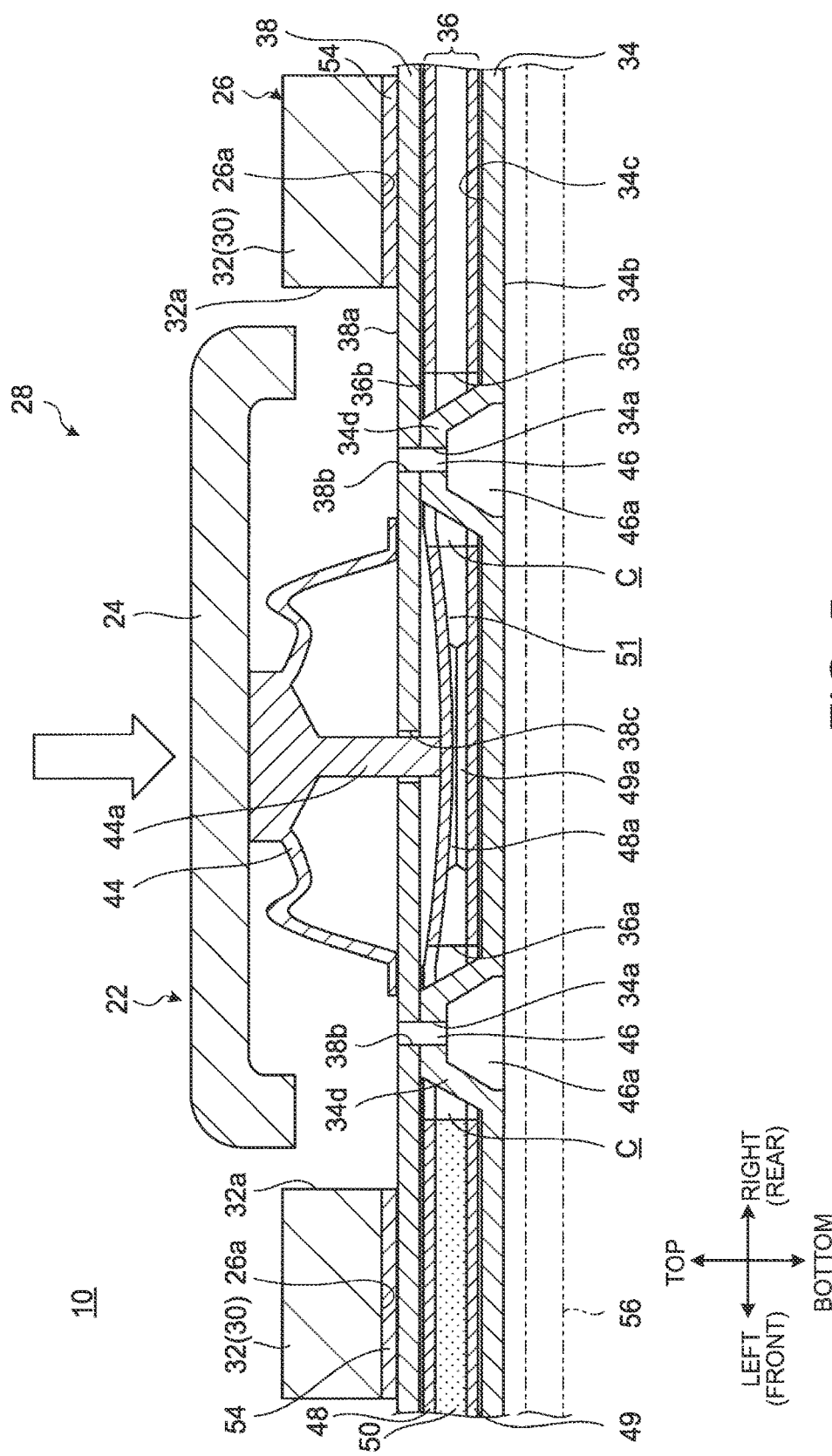
FIG. 5 is a side cross-sectional view illustrating a state where a key top illustrated in FIG. 3 is depressed.

In the membrane sheet 36, when the upper contact sheet 48 is pressed by the pressing portion 44a of the rubber dome 44 so as to be elastically deformed to the lower contact sheet 49 side, the movable contact 48a abuts on the fixed contact 49a to close the contacts (see FIG. 5). In this case, air in the internal space compressed between the upper contact sheet 48 and the lower contact sheet 49 flows into the ventilation passage 51. In the membrane sheet 36, when the pressing by the pressing portion 44a is canceled, the movable contact 48a separates from the fixed contact 49a again to open the contacts (see FIG. 3). In FIG. 5, the illustration of the guide mechanism 40 and the holder 42 is omitted.

In the membrane sheet 36, the hole portions 36a are provided which penetrate the membrane sheet 36 in the plate thickness direction, through which the connection members 46 are passed, and in which the support portions 34d are disposed. The hole portions 36a penetrate the upper contact sheet 48, the spacer 50, and the lower contact sheet 49 at positions corresponding to the connection members 46. The hole portion 36a forms a gap C between the connection member 46 passing through the hole portion 36a and the outer surface of the support portion 34d. More specifically, the inner diameter of the hole portion 36a is sufficiently larger than the outer diameters of the connection member 46 and the support portion 34d. Therefore, the membrane sheet 36 is in a state of being movable in the in-plane direction in the space formed by the support portions 34d between the cover sheet 38 and the base sheet 34.

The cover sheet 38 is laminated on an upper surface 36b of the membrane sheet 36, i.e., the upper surface 36b of the upper contact sheet 48. The cover sheet 38 is a sheet-like member formed of resin materials, such as polyethylene terephthalate (PET) and polycarbonate (PC), for example. The plate thickness of the cover sheet 38 is about 0.05 mm to 0.2 mm and 0.2 mm in this embodiment, for example. The cover sheet 38 may be configured by molding metal materials, such as aluminum, into a sheet-like member. However, the weight of the metal materials is generally larger than that of resin materials, and therefore, when the cover sheet 38 is formed of metal, the weight of the keyboard device 10 may increase.

The cover sheet 38 is connected to the base sheet 34 through the connection members 46. In the cover sheet 38, hole portions 38b are provided which penetrate the cover sheet 38 in the plate thickness direction and through which the connection members 46 are passed. The hole portions 38b are configured so as to have almost no gaps between the hole portions 38b and the connection members 46 and position and fix the connection members 46 and the cover sheet 38.

Therefore, such a keyboard assembly 28 is configured so that the membrane sheet 36 is supported so as to be movable in the in-plane direction between the cover sheet 38 and the base sheet 34 in a state where the cover sheet 38 and the base sheet 34 are connected through the connection members 46. Furthermore, in the keyboard assembly 28, the key switch 22 is supported on the upper surface 38a of the cover sheet 38 through the holder 42 and the holder 42 is connected to the cover sheet 38 and the base sheet 34 through the connection members 46.

Next, a method for assembling the keyboard assembly 28 to the frame member 26 is described.

As illustrated in FIG. 2 and FIG. 3, in the keyboard assembly 28, the upper surface 38a of the cover sheet 38 is bonded and fixed to a lower surface (rear surface) 26a of the frame member 26 through a bonding portion 54.

The bonding portion 54 is formed by an adhesive or a double-sided tape, for example. In the case of this embodiment, the bonding portion 54 is provided throughout the lower surface 26a of the outer frame portion 30 and the inner frame portion 32 of the frame member 26 (see FIG. 2). Thus, in the keyboard assembly 28, an outer peripheral edge portion thereof and the circumference of all the key switches 22 are individually bonded and fixed to the frame member 26 by the bonding portion 54. As a result, the keyboard device 10 can obtain high rigidity and an operation feeling of each key switch 22 with solid response and high quality is achieved.

The bonding portion 54 may not be provided throughout the lower surface 26a of the frame member 26 and may be provided only in a part of the lower surface 26a. However, the bonding portion 54 can sufficiently secure the rigidity of the keyboard device 10 by being provided at appropriate intervals in at least one part of the outer frame portion 30 and one part of the inner frame portion 32.

The keyboard device 10 according to this embodiment may be configured so that a sensor 56 capable of detecting a touch operation to the key top 24 may be provided on the lower surface 34b side of the base sheet 34 (see FIG. 3). More specifically, the keyboard device 10 according to this embodiment can be configured so that no metal materials are present from the key top 24 to the base sheet 34 by forming the cover sheet 38 and the base sheet 34 with resin materials. Then, in the keyboard device 10, a predetermined shortcut key is depressed to switch a keyboard mode to a touchpad mode, whereby a touch operation of tracing the upper surface of each key top 24 with a fingertip or the like is performed, and then the touch operation can be detected by the sensor 56.

Figure 6:
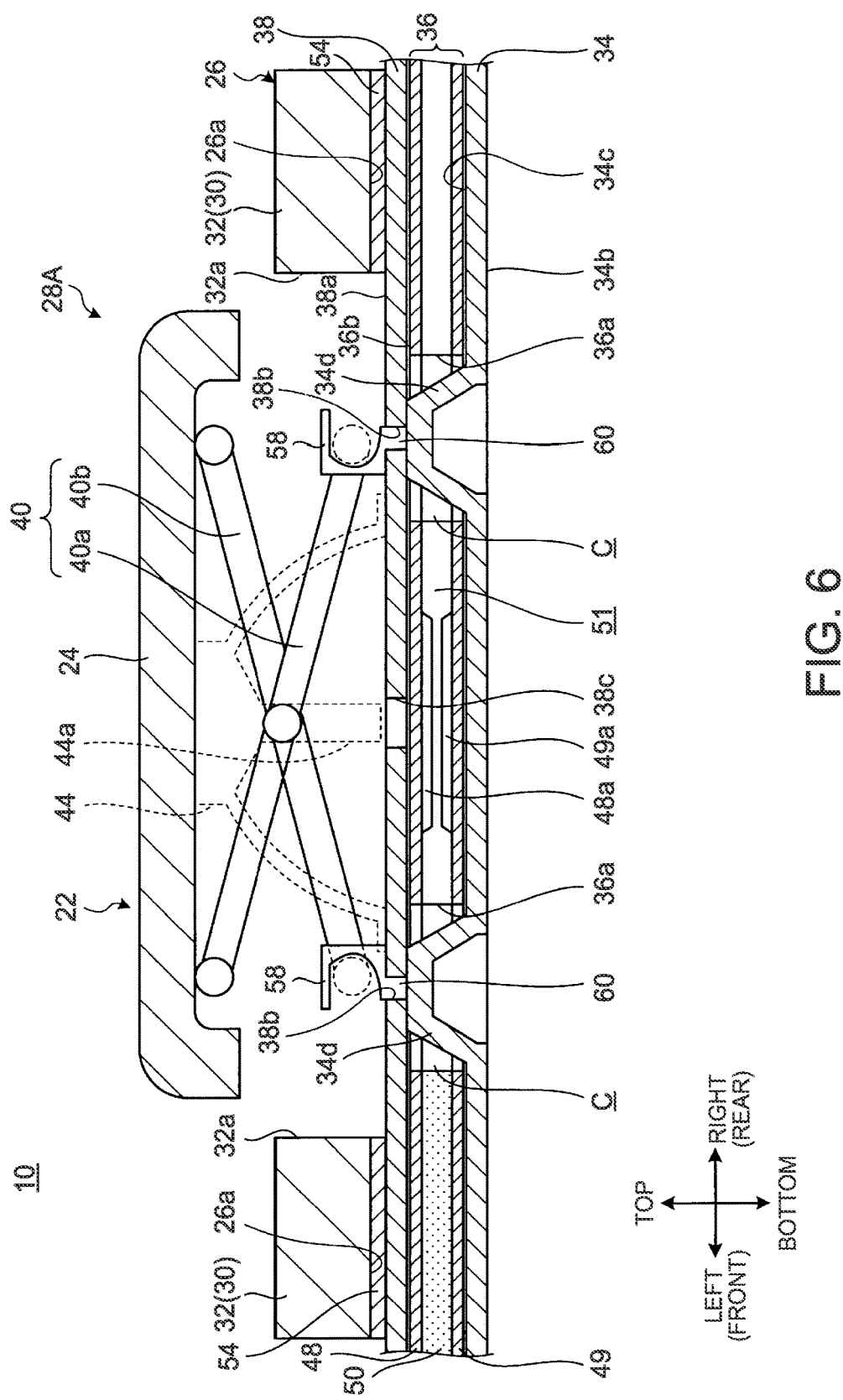
FIG. 6 is a side cross-sectional view schematically illustrating the configuration of a keyboard device using a keyboard assembly according to a modification.

FIG. 6 is a side cross-sectional view schematically illustrating the configuration of the keyboard device 10 using a keyboard assembly 28A according to a modification.

As illustrated in FIG. 6, the keyboard assembly 28A is different from the keyboard assembly 28 illustrated in FIG. 3 in that connection members (pin-shaped member) 60 provided with connection portions 58 are provided in place of the holder 42 and the connection members 46.

The connection members 60 are pin-shaped members of a cylindrical shape or a prism shape projecting upward from the upper surface 34c of the base sheet 34. The connection members 60 are configured so as to be fixed to the upper surface 34c of the base sheet 34 by bonding or welding or integrally molded with the base sheet 34. In the case of this embodiment, the connection members 60 project from the upper surface 34c located on the top surface of the support portion 34d. The connection members 60 pass through the hole portions 36a of the membrane sheet 36 and the hole portions 38b of the cover sheet 38 and the tip (upper end) thereof projects from the upper surface 38a of the cover sheet 38.

Connection portions 58 are configured so as to be fixed to the tip of the connection members 60 projecting from the upper surface 38a by adhesion or welding or integrally molded with the connection members 60. The connection portions 58 are members disposed on the upper surface 38a of the cover sheet 38 and supporting the lower rotation shafts of the guide mechanism 40 as with the holder 42. The connection portions 58 are lateral U-shaped engagement pieces directed to the outside of the key switch 22, for example, and rotatably and horizontally movably support the lower rotation shafts of the frame bodies 40a and 40b of the guide mechanism 40.

Therefore, such a keyboard assembly 28A is also configured so that the cover sheet 38 and the base sheet 34 are connected through the connection members 60 and the membrane sheet 36 is supported so as to be movable in the in-plane direction in space formed by the support portions 34d between the cover sheet 38 and the base sheet 34. Furthermore, in the keyboard assembly 28A, the key switch 22 is supported on the upper surface 38a of the cover sheet 38 through the connection portions 58 and the connection portions 58 are connected to the cover sheet 38 and the base sheet 34 through the connection members 60. The keyboard assembly 28A may be configured so that the holder 42 is provided in place of the connection portions 58 and the tips of the connection members 60 are connected to the lower surface of the holder 42. Moreover, in the keyboard assembly 28A, the fixation structure of the connection members 60 to the base sheet 34 may be structures other than bonding, welding, and the like. For example, a configuration may be acceptable in which the hole portions 34a are formed in the base plate 34, locking pieces similar to the locking pieces 46a are provided on the tips of the connection members 60 passed through the hole portions 34a, and the locking pieces are locked with the base sheet 34 as with the configuration example illustrated in FIG. 3.

As described above, the keyboard device 10 according to this embodiment has the base sheet 34, the membrane sheet 36 disposed on the upper surface 34c of the base sheet 34, the cover sheet 38 disposed on the upper surface 36b of the membrane sheet 36 and supporting the membrane sheet 36 in the state of being movable in the in-plane direction between the membrane sheet 38 and the base sheet 34, the connection members 46 (60) connecting the base sheet 34 and the cover sheet 38, the plurality of key tops 24 vertically movably supported by the guide mechanism 40 provided on the upper surface 38a side of the cover sheet 38 and bringing the movable contact 48a and the fixed contact 49a which are contacts of the membrane sheet 36 into contact with each other or separating the contacts from each other by being depressed, and the frame member 26 partitioning the key tops 24 adjacent to each other and having the lower surface 26a to which the upper surface 38a of the cover sheet 38 is bonded and fixed.

Thus, in the keyboard device 10, the cover sheet 38 supporting the membrane sheet 36 between the cover sheet 38 and the base sheet 34 and the frame member 26 are bonded and fixed to each other. More specifically, since the keyboard assembly 28 (28A) provided with the membrane sheet 36 and the keytops are bonded and fixed to the frame member 26, the keyboard device 10 has no necessity of using a large number of screws for the fixation thereof and can also be configured so as to use no screws. Therefore, the keyboard device 10 can prevent an increase in the cost and the weight due to an increase in the number of components while securing the rigidity and securing a high operation feeling of the key tops 24 and further can also reduce an assembling operation process and a screw hole processing operation to the frame member 26.

However, when the keyboard assembly 28 (28A) is directly bonded and fixed to the frame member 26 as in this embodiment, there has been a concern that the following malfunctions are caused. More specifically, the membrane sheet 36 sometimes causes thermal expansion or thermal contraction due to changes of the environmental temperatures in manufacturing the keyboard device 10 or during the use thereof. In this case, when the upper contact sheet 48 thermally expands to be bent to the ventilation passage 51 side, for example, a malfunction may be caused that the movable contact 48a unintentionally contacts the fixed contact 49a. Moreover, when the lower contact sheet 49 thermally expands to the ventilation passage 51 side, for example, a malfunction may also be caused that the upper contact sheet 48 and the lower contact sheet 49 contact each other to block the ventilation passage 51, and thus air does not smoothly flow into the ventilation passage 51 and stays in the depression operation of the key top 24, so that the movable contact 48a and the fixed contact 49acannot be appropriately brought into contact with each other.

For that matter, in the keyboard device 10, the membrane sheet 36 is supported in the state of being movable in the in-plane direction between the base sheet 34 and the cover sheet 38 connected to each other by the connection members 46 (60). Therefore, even when the membrane sheet 36 thermally expands, for example, the membrane sheet 36 can expandably move between the base sheet 34 and the cover sheet 38, and thus the occurrence of the above-described malfunctions can be prevented.

In the keyboard device 10, the base sheet 34 and the cover sheet 38 are formed of resin materials. For example, the density of aluminum is 2.68 g/cm$^3$ and the density of polyethylene terephthalate is 1.39 g/cm$^3$. Therefore, the formation of the base sheet 34 and the cover sheet 38 by resin materials enables a considerable weight reduction as compared with a case of the formation thereof by metal materials. Moreover, since the cover sheet 38 (keyboard assembly 28 (28A)) is directly bonded and fixed to the frame member 26, the keyboard device 10 can secure high rigidity although the base sheet 34 and the cover sheet 38 are formed of resin materials. Moreover, even when the keyboard device 10 is configured so that the keyboard assembly 28 (28A) in which the base sheet 34 is formed of resin materials is bonded and fixed to the frame member 26 as described above, the membrane sheet 36 is disposed in a movable state, and therefore the occurrence of the above-described malfunctions of the membrane sheet 36 due to changes of the environmental temperatures and the like can be prevented. Only one of the base sheet 34 and the cover sheet 38 may be formed of resin materials and the other one may be formed of metal materials.

Figure 7:
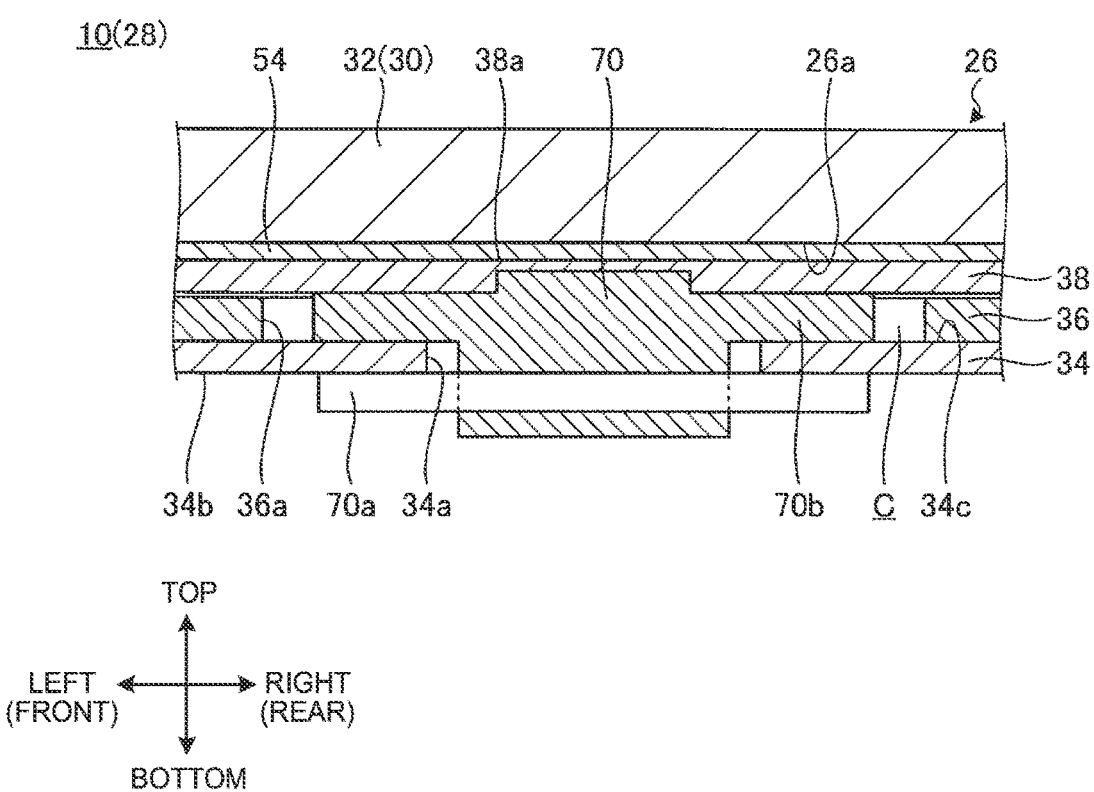
FIG. 7 is a side cross-sectional view schematically illustrating the configuration of a keyboard device having a connection member according to another modification.

As illustrated in FIG. 7, a connection member 70 may be used in place of the connection members 46 (60) or together with the connection members 46 (60).

The connection member 70 is a member connecting the cover sheet 38 and the base sheet 34 at a position between the key switch 22 and the key switch 22, i.e., a position overlapping with the inner frame portion 32 or the outer frame portion 30 of the frame member 26. Therefore, the connection member 70 is a separate structure from the holder 42 or the connection portions 58. The connection member 70 is integrally formed with the cover sheet 38 and projects downward from the lower surface of the cover sheet 38. The connection member 70 is bonded and fixed to the cover sheet 38 using an adhesive or integrally molded with the cover sheet 38 by insert molding or the like, for example. The connection member 70 penetrates the membrane sheet 36 and the base sheet 34 and the tip (lower end) thereof is connected to the base sheet 34 using a locking piece 70a. The locking piece 70a is bonded to the tip of the connection member 70 by thermal caulking, for example. The connection member 70 has a support portion 70b. The support portion 70b is placed between the cover sheet 38 and the base sheet 34 within the hole portion 36a of the membrane sheet 36 and serves as a support forming space accommodating the membrane sheet 36 in a state of being movable in the in-plane direction between the cover sheet 38 and the base sheet 34. More specifically, the support portion 70b has a height dimension larger than the plate thickness of the membrane sheet 36 and a gap C is formed between the outer surface thereof and the inner surface of the hole portion 36a.

The keyboard device 10 can increase the connection strength between the cover sheet 38 and the base sheet 34 by being provided with such a connection member 70. Moreover, the connection member 70 is advantageous in that the shape degree of freedom is high because the connection member 70 is not configured so as to support the guide mechanism 40 of the key top 22 and the fixation strength between the connection member 70 and the cover sheet 38 can be more easily secured as compared with the connection members 46 and 60. Furthermore, the connection member 70 is advantageous in that, since the connection member 70 is disposed at a position away from the guide mechanism 40, influence on the thickness of the keyboard device 10 is low. The connection member 70 may be integrally formed with the base sheet 34.

It is a matter of course that the present invention is not limited to the embodiments described above and can be freely altered without deviating from the scope of the present invention.

In the embodiments described above, although the base sheet 34 and the cover sheet 38 are configured by thin sheet-like members, the sheet-like members may be those of a hard plate structure with a thickness of about 1 mm.

The invention claimed is:

1. A keyboard device comprising:
a first sheet-like member;
a membrane sheet disposed on an upper surface of the first sheet-like member;
a second sheet-like member disposed on an upper surface of the membrane sheet and supports the membrane sheet between the first sheet-like member and the second sheet-like member while being movable in an in-plane direction;
a connection member connecting the first sheet-like member and the second sheet-like member;
a plurality of key tops vertically movable and supported by a guide mechanism on an upper surface side of the second sheet-like member and brings the membrane sheet into contact with the second sheet-like member or separates the contact from the second sheet-like member;
a frame member partitioning adjacent key tops and having a lower surface to which the upper surface of the second sheet-like member is bonded and fixed; and
a support between the first sheet-like member and the second sheet-like member and regulates an interval between the first sheet-like member and the second sheet-like member to a dimension larger than a plate thickness of the membrane sheet.

2. The key board device according to claim 1, wherein:
the first sheet-like member and the second sheet-like member are formed of resin materials.

3. The key board device according to claim 1, wherein:
the frame member has an outer frame portion that surrounds an entire outer periphery of the plurality of key tops and has an inner frame portion in a mesh shape that partitions the key tops inside the outer frame portion, and
the second sheet-like member is bonded and fixed to the outer frame portion and the inner frame portion.

4. The keyboard device according to claim 2, wherein:
a sensor capable of detecting a touch operation to at least one of the key tops is provided on a lower surface side of the first sheet-like member.

5. A keyboard device comprising:
a first sheet-like member;
a membrane sheet disposed on an upper surface of the first sheet-like member;
a second sheet-like member disposed on an upper surface of the membrane sheet and supports the membrane sheet between the first sheet-like member and the second sheet-like member while being movable in an in-plane direction;
a connection member connecting the first sheet-like member and the second sheet-like member;
a plurality of key tops vertically movable and supported by a guide mechanism on an upper surface side of the second sheet-like member and brings the membrane sheet into contact with the second sheet-like member or separates the contact from the second sheet-like member;
a frame member partitioning adjacent key tops and having a lower surface to which the upper surface of the second sheet-like member is bonded and fixed;
wherein the connection member is a pin-shaped member suspended from a support member supporting the guide mechanism on the upper surface of the second sheet-like member, and the pin-shaped member is connected to the first sheet-like member and passes through a hole portion in the second sheet-like member and a hole portion in the membrane sheet, and
a gap between an inner surface of the hole portion of the membrane sheet and an outer surface of the pin-shaped member.

6. A keyboard device comprising:
a first sheet-like member;
a membrane sheet disposed on an upper surface of the first sheet-like member;
a second sheet-like member disposed on an upper surface of the membrane sheet and supports the membrane sheet between the first sheet-like member and the second sheet-like member while being movable in an in-plane direction;
a connection member connecting the first sheet-like member and the second sheet-like member;
a plurality of key tops vertically movable and supported by a guide mechanism on an upper surface side of the second sheet-like member and brings the membrane sheet into contact with the second sheet-like member or separates the contact from the second sheet-like member;
a frame member partitioning adjacent key tops and having a lower surface to which the upper surface of the second sheet-like member is bonded and fixed;
wherein the connection member is a pin-shaped member projecting from the first sheet-like member, and the pin-shaped member projects from the upper surface of the second sheet-like member and passes through a hole portion in the membrane sheet and a hole portion in the second sheet-like member,
a tip of the pin-shaped member has a connection portion connected to the guide mechanism or connected to a support member supporting the guide mechanism on the upper surface of the second sheet-like member, and
a gap between the inner surface of the hole portion of the membrane sheet and the outer surface of the pin-shaped member.

\* \* \* \* \*